United States Patent
Labrot et al.

(10) Patent No.: US 10,675,954 B2
(45) Date of Patent: Jun. 9, 2020

(54) WINDSHIELD WITH ELECTRICALLY CONTROLLABLE SUN VISOR

(71) Applicant: SAINT-GOBAIN GLASS FRANCE, Courbevoie (FR)

(72) Inventors: Michael Labrot, Aachen (DE); Dieter Linnhoefer, Saint-Martin d'Uriage (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/772,036

(22) PCT Filed: Feb. 22, 2017

(86) PCT No.: PCT/EP2017/054001
§ 371 (c)(1),
(2) Date: Apr. 27, 2018

(87) PCT Pub. No.: WO2017/157626
PCT Pub. Date: Sep. 21, 2017

(65) Prior Publication Data
US 2018/0281570 A1    Oct. 4, 2018

(30) Foreign Application Priority Data
Mar. 17, 2016    (EP) .................... 16160838

(51) Int. Cl.
*G02F 1/163* (2006.01)
*B60J 3/04* (2006.01)
*B32B 17/10* (2006.01)

(52) U.S. Cl.
CPC .......... *B60J 3/04* (2013.01); *B32B 17/10036* (2013.01); *B32B 17/1066* (2013.01);
(Continued)

(58) Field of Classification Search
CPC .......... G02F 1/163; G02F 1/155; G02F 1/153; E06B 2009/2464; E06B 9/24
(Continued)

(56) References Cited

U.S. PATENT DOCUMENTS

| 4,749,261 A | * | 6/1988 | McLaughlin ..... B32B 17/10018 349/104 |
| 5,408,353 A | * | 4/1995 | Nichols ............. B32B 17/10036 359/260 |

(Continued)

FOREIGN PATENT DOCUMENTS

| DE | 102005007427 A1 | 8/2006 |
| DE | 102005049081 B3 | 6/2007 |

(Continued)

OTHER PUBLICATIONS

International Search Report for International Application No. PCT/EP2017/054001 filed Feb. 22, 2017 on behalf of Saint-Gobain Glass France. dated Jun. 1, 2017. 7 pages. (German Original + English Translation).

(Continued)

*Primary Examiner* — Mohammed A Hasan

(74) *Attorney, Agent, or Firm* — Pillsbury Winthrop Shaw Pittman LLP

(57) ABSTRACT

A windshield with an electrically controllable sun visor is described. The windshield includes an outer pane and an inner pane that are bonded to one another via an intermediate layer. According to one aspect, a functional element with electrically controllable optical properties is incorporated into the intermediate layer and above a central field of vision. The functional element is connected to the outer pane via a region of a first thermoplastic layer, and is connected to the inner pane via a region of a second thermoplastic layer. According to another aspect, the region of the first (Continued)

thermoplastic layer and/or the region of the second thermoplastic layer is tinted or colored.

15 Claims, 4 Drawing Sheets

(52) U.S. Cl.
CPC .... B32B 17/1077 (2013.01); B32B 17/10192 (2013.01); B32B 17/10339 (2013.01); B32B 17/10348 (2013.01); B32B 17/10504 (2013.01); B32B 17/10761 (2013.01); B32B 17/10788 (2013.01); B32B 17/10871 (2013.01); *B32B 2250/40* (2013.01); *B32B 2307/412* (2013.01); *B32B 2605/006* (2013.01)

(58) Field of Classification Search
USPC .......................................... 359/275
See application file for complete search history.

(56) References Cited

U.S. PATENT DOCUMENTS

| | | | | |
|---|---|---|---|---|
| 6,034,813 | A * | 3/2000 | Woodard | ............... B32B 17/10 359/360 |
| 2008/0264466 | A1 | 10/2008 | Cuma | |
| 2014/0192286 | A1 | 7/2014 | Tasaka et al. | |
| 2015/0331296 | A1 | 11/2015 | Mennig et al. | |
| 2016/0052446 | A1 | 2/2016 | Frey et al. | |
| 2016/0079333 | A1 * | 3/2016 | Shishido | ............. H01L 27/3262 257/72 |

FOREIGN PATENT DOCUMENTS

| | | |
|---|---|---|
| DE | 102007027296 A1 | 12/2008 |
| DE | 102011003256 A1 | 8/2012 |
| DE | 102013001334 A1 | 7/2014 |
| JP | S55-124325 U | 9/1980 |
| JP | S61-201216 A | 9/1986 |
| JP | 2008-284914 A | 11/2008 |
| JP | 2013-076052 A | 4/2013 |
| JP | 2014-065489 A | 4/2014 |
| JP | 2014-182287 A | 9/2014 |
| KR | 10-2014-0078771 A | 6/2014 |
| WO | 2013/177676 A1 | 12/2013 |

OTHER PUBLICATIONS

Written Opinion for International Appiication No. PCT/EP2017/054001 filed on Feb. 22, 2017 on behalf of Saint-Gobain Glass France. dated Jun. 1, 2017. 11 pages. (English + German Translation).

* cited by examiner

WINDSHIELD WITH ELECTRICALLY CONTROLLABLE SUN VISOR

CROSS REFERENCE TO RELATED APPLICATIONS

The present application is the U.S. National Stage of International Patent Application No. PCT/EP2017/054001 filed on Feb. 22, 2017, which, in turn, claims priority to European Patent Application No. 16160838.5 filed on Mar. 17, 2016.

FIELD

The invention relates to a windshield with an electrically controllable sun visor, a method for its production, and the use of a tinted thermoplastic layer in such a windshield.

BACKGROUND

For protection against dazzling of the driver or other occupants, conventional motor vehicles have mechanical sun visors. These are hinge-mounted on the vehicle roof and can be pivoted downward as needed to prevent or at least to mitigate the dazzling of the driver or front-seat passenger, for example, when the sun is low.

Also known, are windshields into which a sun visor is integrated in the form of a functional element with electrically controllable optical properties, in particular with electrically controllable transmittance or scattering properties. Thus, the driver can control the transmittance behavior of the windshield itself relative to sunlight; the conventional mechanical sun visor can be dispensed with. By this means, the weight of the vehicle can be reduced and space is gained in the roof region. In addition, electrical control of the sun visor is more convenient for the driver than the manual folding down of the mechanical sun visor.

Windshields with electrically controllable sun visors are, for example, known from DE 102013001334 A1, DE 102005049081 B3, DE 102005007427 A1, and DE 102007027296 A1.

One possible controllable functional element for realizing the controllable sun visor is a so-called "PDLC" functional element (polymer dispersed liquid crystal). The active layer contains liquid crystals that are incorporated into a polymer matrix. When no voltage is applied, the liquid crystals are randomly oriented, resulting in strong scattering of the light passing through the active layer. When a voltage is applied to the flat electrodes, the liquid crystals align themselves in a common direction and the transmittance of light through the active layer is increased. The PDLC functional element acts less by reducing total transmittance, but rather by increasing scattering to ensure protection against dazzling.

PDLC functional elements have, in the voltage-free state, a white, milky appearance, which is frequently considered unaesthetic. Consequently, such controllable sun visors are poorly accepted by the auto industry and the end user.

U.S. Pat. No. 4,749,261 A discloses a vehicle composite pane with an electrically controllable functional element laminated therein, which can have a tinted or colored flat electrode. The functional element can be obscured thereby; however, strict limits are imposed on the design freedom since the tinting is restricted to the actual functional element.

US 2014/192286 A1 discloses a composite pane with an electrically controllable functional element laminated therein. The thermoplastic intermediate layers via which the functional element is bonded to the glass panes can be completely tinted or colored.

US 2015/331296 A1 discloses a composite pane with an electrically controllable functional element laminated therein, wherein the glass panes can be completely tinted or colored.

SUMMARY

The object of the present invention is to provide a windshield with an electrically controllable sun visor, which is improved, in particular, in terms of its aesthetic effect.

The object of the present invention is accomplished by a windshield with an electrically controllable sun visor in accordance with the various embodiments disclosed in the present application.

The windshield according to the invention with an electrically controllable sun visor comprises at least an outer pane and an inner pane that are bonded to one another via an intermediate layer. The windshield is intended, in a window opening of a vehicle, to separate the interior from the external environment. In the context of the invention, "inner pane" means the pane of the windshield facing the interior (vehicle interior). "Outer pane" means the pane facing external environment.

The windshield has an upper edge and a lower edge as well as two side edges running between the upper edge and the lower edge. "Upper edge" means the edge that is intended to point upward in the installed position. "Lower edge" means the edge that is intended to point downward in the installed position. The upper edge is frequently also referred to as the "roof edge"; the lower edge, as the "engine edge".

Windshields have a central field of vision whose optical quality is subject to stringent requirements. The central field of vision must have high light transmittance (typically greater than 70%). Said central field of vision is, in particular, that field of vision that is referred to by the person skilled in the art as the field of vision B, vision region B, or zone B. The field of vision B and its technical requirements are specified in Regulation No. 43 of the Economic Commission for Europe of the United Nations (UN/ECE) (ECE-R43, "Uniform Provisions Concerning the Approval of Safety Glazing Materials and Their Installation on Vehicles"). The field of vision B is defined there in Annex 18.

The windshield according to the invention includes a functional element with electrically controllable optical properties, which is incorporated into the intermediate layer. The functional element is arranged above the central field of vision (field of vision B). This means that the functional element is arranged in the region between the central field of vision and the upper edge of the windshield. The functional element need not cover the entire region but is positioned completely within this region and does not protrude into the central field of vision. In other words, the functional element is nearer the upper edge of the windshield than the central field of vision. Thus, the transmittance of the central field of vision is not impaired by the functional element, which is situated at a position similar to that of a conventional mechanical sun visor in the downward pivoted state.

The functional element is bonded to the outer pane via a region of a first thermoplastic layer and to the inner pane via a region of a second thermoplastic layer. Typically, the intermediate layer is formed by at least the first and the second thermoplastic layer, which are arranged areally one atop another, with the functional element inserted between the two layers. The regions of the layers overlapping the functional element then form the regions that bond the functional element to the panes. In other regions of the pane where the thermoplastic layers make direct contact with one another, they can fuse during lamination such that the two original layers are no longer discernible under certain circumstances and, instead, there is a homogeneous intermediate layer.

A thermoplastic layer can, for example, be formed by a single thermoplastic film. A thermoplastic layer can also be formed by segments of different thermoplastic films whose side edges abut one another.

According to the invention, said region of the first or the second thermoplastic layer, via which the functional element is bonded to the outer pane or to the inner pane, is tinted or colored. The transmittance of this region in the visible spectral range is thus reduced relative to a non-tinted or non-colored layer. The tinted/colored region of the thermoplastic layer thus lowers the transmittance of the windshield in the region of the sun visor. In particular, the aesthetic impression of the functional element is improved because the tinting results in a more neutral appearance that is more pleasant for the viewer. This is the advantage of the invention.

The windshield is preferably provided for a motor vehicle, particularly preferably for a passenger car.

In the context of the invention, the term "electrically controllable optical properties" means those properties that are continuously controllable, but also refers equally to those that can be switched between two or more discrete states.

The electrical control of the sun visor is done, for example, using knobs, rotary controls, or slide controls that are integrated into the dashboard of the vehicle. A switching surface for controlling the sun visor, for example, a capacitive switching surface, can, however, also be integrated into the windshield. Alternatively, the sun visor can also be controlled by contact-free methods, for example, by gesture detection, or as a function of the state of the pupil or eyelid ascertained by a camera and suitable evaluation electronics.

The tinted or colored region of the thermoplastic layer preferably has transmittance in the visible spectral range of 10% to 50%, particularly preferably of 20% to 40%. Particularly good results in terms of protection against dazzling and optical appearance are thus achieved.

The intermediate layer, i.e., the first and the second thermoplastic layer and any other polymeric layers, is not tinted or colored in the central field of vision but is, instead, clear and transparent. This ensures that the through-vision through the central field of vision is unrestricted such that the pane can be used as a windshield. The term "a transparent thermoplastic layer" means a layer with light transmittance in the visible spectral range of at least 70%, preferably at least 80%. The transparent intermediate layer is present at least in the field of vision A, preferably also in the field of vision B per ECE-R43.

The thermoplastic layer can be implemented by a single thermoplastic film in which the tinted or colored region is produced by local tinting or coloring. Such films can be obtained, for example, by coextrusion. Alternatively, an untinted film segment and a tinted or colored film segment can be combined to form the thermoplastic layer.

The tinted or colored region can be homogeneously colored or tinted, in other words, can have location-independent transmittance. However, the tinting or coloring can also be inhomogeneous; in particular, a transmittance progression can be realized. In one embodiment, the transmittance level in the tinted or colored region decreases at least in sections with increasing distance from the upper edge. Thus, sharp edges of the tinted or colored region can be avoided such that the transition from the sun visor to the transparent region of the windshield is gradual, which appears more attractive aesthetically.

In one embodiment of the invention, the tinted or colored region of the first or the second thermoplastic layer protrudes beyond the lower edge of the functional element, i.e., extends farther in the direction toward the central field of vision than the functional element. Thus, a particularly attractive appearance is produced. The protruding region preferably has a transmittance progression, wherein the transmittance increases in the direction toward the central field of vision and the tinting is also phased out gradually toward the central field of vision.

In an advantageous embodiment, the region of the first thermoplastic layer, i.e., the region between the functional element and the outer pane, is tinted. This creates a particularly aesthetic impression of the vehicle observed from the outside. The region of the second thermoplastic layer between the functional element and the inner pane can, optionally, be additionally colored or tinted.

In an advantageous embodiment, the functional element is a PDLC functional element (polymer dispersed liquid crystal). As has already been described above, such PDLC functional elements have an unaesthetic milky appearance in the voltage-free state. The advantageous effect of the invention, namely, the improvement of the visual impression, is of special concern in connection with PDLC functional elements.

The active layer of a PDLC functional element contains liquid crystals that are incorporated into a polymer matrix. When no voltage is applied to the flat electrodes, the liquid crystals are randomly oriented, resulting in strong scattering of the light passing through the active layer. When a voltage is applied to the flat electrodes, the liquid crystals align themselves in a common direction and the transmittance of light through the active layer is increased.

It is, however, in principle, also possible to use other types of controllable functional elements, for example, electrochromic functional elements or SPD functional elements (suspended particle device). The controllable functional elements mentioned and their operating principles are known per se to the person skilled in the art such that it is possible to dispense with a detailed description here.

The controllable functional element typically comprises an active layer between two flat electrodes. The active layer has the controllable optical properties that can be controlled via the voltage applied to the flat electrodes. The flat electrodes and the active layer are typically arranged substantially parallel to the surfaces of the outer pane and the inner pane. The flat electrodes are electrically connected to an external voltage source in a manner known per se. The electrical contacting is realized by suitable connection cables, for example, foil conductors, which are optionally connected to the flat electrodes via so-called busbars, for example, strips of an electrically conductive material or electrically conductive imprints.

The flat electrodes are preferably designed as transparent, electrically conductive layers. The flat electrodes preferably contain at least one metal, a metal alloy, or a transparent conducting oxide (TCO). The flat electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The flat electrodes preferably have a thickness of 10 nm to 2 μm auf, particularly preferably of 20 nm to 1 μm, most particularly preferably of 30 nm to 500 nm.

The functional element can, of course, have, besides the active layer and the flat electrodes, other layers known per se, for example, barrier layers, blocker layers, antireflection layers, protective layers, and/or smoothing layers.

The functional element is preferably present as a multilayer film with two outer carrier films. In the case of such a multilayer film, the flat electrodes and the active layer are arranged between the two carrier films. Here, the term "outer carrier film" means that the carrier films form the two surfaces of the multilayer film. The functional element can thus be prepared as a laminated film, which can be processed advantageously. The functional element is advantageously protected by the carrier film against damage, in particular corrosion. The multilayer film includes, in the order indicated, at least a carrier film, a flat electrode, an aktive layer, another flat electrode, and another carrier film.

The carrier films preferably contain at least one thermoplastic polymer, particularly preferably polyethylene terephthalate (PET). This is particularly advantageous in terms of the stability of the multilayer film. However, the carrier films can also include, for example, ethylene vinyl acetate (EVA) and/or polyvinyl butyral (PVB), polypropylene, polycarbonate, polymethylmethacrylate, polyacrylate, polyvinyl chloride, polyacetate resin, casting resins, acrylates, fluorinated ethylene propylene, polyvinyl fluoride, and/or ethylene tetrafluoroethylene. The thickness of each carrier film is preferably from 0.1 mm to 1 mm, particularly preferably from 0.1 mm to 0.2 mm.

Typically, the carrier films have in each case an electrically conductive coating that acts as a flat electrode and preferably faces the active layer.

Functional elements are commercially available as multilayer films. The functional element to be integrated is typically cut from a large-dimension multilayer film into the desired shape and size. This can be done mechanically, for example, with a knife. In an advantageous embodiment, the cutting is done using a laser. It has been demonstrated that the side edge is in this case more stable than with mechanical cutting. With mechanically cut side edges, there can be a risk that the material pulls back, so to speak, which is visually conspicuous and disadvantageously affects the aesthetics of the pane.

In an advantageous embodiment, the functional element has an edge seal. The edge seal circumferentially covers the side edge of the functional element and, in particular, prevents the diffusion of chemical components of the thermoplastic layers, for example, plasticizers, into the active layer. At least along the side edges visible in through-vision through the windshield, in particular the lower edge of the functional element and preferably along all side edges, the edge seal is formed by a transparent colorless adhesive or a transparent colorless adhesive tape. For example, acrylic-based or silicon-based adhesive tapes can be used as the edge seal. The transparent colorless edge seal has the advantage that the edge of the functional element is not disturbingly conspicuous when looking through the windshield.

The edges of the functional element are referred to according to the installed position of the windshield. Thus, the "lower edge" of the functional element is that one of its side edges that faces away from the upper edge of the windshield and points toward the central field of vision. The "upper edge" of the functional element faces the upper edge of the windshield. The "side edges" of the functional element run between the upper edge and the lower edge.

In a preferred embodiment, the functional element, more precisely the side edges of the functional element are surrounded circumferentially by a third thermoplastic layer. The third thermoplastic layer is implemented frame-like with a recess into which the functional element is inserted. The third thermoplastic layer can be formed by a thermoplastic film into which the recess was introduced by cutting. Alternatively, the third thermoplastic layer can also be composed of a plurality of film sections around the functional element. The intermediate layer is formed from a total of at least three thermoplastic layers arranged areally atop one another, with the middle layer having a recess in which the functional element is arranged. During production, the third thermoplastic layer is arranged between the first and the second thermoplastic layer, with the side edges of all thermoplastic layers preferably situated congruently. The third thermoplastic layer preferably has approx. the same thickness as the functional element. Thus, the local difference in thickness of the windshield, which is introduced by the locally limited functional element, is compensated such that glass breakage during lamination can be avoided.

The side edges of the functional element visible when looking through the windshield are preferably arranged flush with the third thermoplastic layer such that there is no gap between the side edge of the functional element and the associated side edge of the thermoplastic layer. This is true in particular for the lower edge of the functional element, which is typically visible. Thus, the boundary between the third thermoplastic layer and the functional element is visually inconspicuous.

In a preferred embodiment, the lower edges of the functional element and of the tinted region of the thermoplastic layer are adapted to the shape of the upper edge of the windshield, resulting in a visually attractive appearance. Since the upper edge of a windshield is typically curved, in particular concavely curved, the lower edge of the functional element and of the tinted region is preferably designed curved. Particularly preferably, the lower edges of the functional element are implemented substantially parallel to the upper edge of the windshield. However, it is also possible to construct the sun visor from two halves, straight in each case, which are arranged at an angle relative to one another and of which the upper edge is approx. V-shaped.

In one embodiment of the invention, the functional element is divided into segments by isolating lines. The isolating lines are introduced, in particular, into the flat electrodes such that the segments of the flat electrode are electrically isolated from one another. The individual segments are connected to the voltage source independently of one another such that they can be actuated separately. Thus, different regions of the sun visor can be switched independently. Particularly preferably, the isolating lines and the segments are arranged horizontally in the installed position. Thus, the height of the sun visor can be controlled by the user. The term "horizontal" is construed broadly here and refers to a propagation direction that runs between the side edges of the windshield. The isolating lines need not necessarily be straight, but, instead, can even be slightly curved, preferably adapted to any curvature of the upper edge of the windshield, in particular substantially parallel to the upper edge of the windshield. Of course, vertical isolating lines are also conceivable.

The isolating lines have, for example, a width of 5 μm to 500 μm, in particular 20 μm to 200 μm. The width of the segments, i.e., the distance between adjacent isolating lines, can be suitably selected by the person skilled in the art in accordance with the requirements in the individual case.

The isolating lines can be introduced by a laser ablation, mechanical cutting, or etching during production of the functional element. Already laminated multilayer films can even be subsequently segmented by laser ablation.

The upper edge and the side edges of the functional element are preferably obscured by an opaque masking print in through-vision through the windshield. Windshields typically have a surrounding peripheral masking print made of an opaque enamel, which serves in particular to protect the adhesive used for installation of the windshield against UV radiation and to obscure it visually. This peripheral masking print is preferably used to also obscure the upper edge and the side edges of the functional element as well as the necessary electrical connections. The sun visor is then advantageously integrated into the appearance of the windshield and only the lower edge can potentially be discerned by the observer. Preferably, both the outer pane and the inner pane have a masking print such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors. It is also possible to realize the sun visor with at least two functional elements separated from one another, with a distance between the functional elements that makes room for sensor or camera windows.

The functional element (or the totality of functional elements in the above-described case of multiple functional elements) is preferably arranged over the entire width of the windshield, minus an edge region on both sides with a width of, for example, 2 mm to 20 mm. The functional element preferably also has a distance from the upper edge of, for example, 2 mm to 20 mm. The functional element is thus encapsulated within the intermediate layer and is protected against contact with the surrounding atmosphere and against corrosion.

The first thermoplastic layer and the second thermoplastic layer and, optionally, the third thermoplastic layer as well, contain at least polyvinyl butyral (PVB), ethylene vinyl acetate (EVA), and/or polyurethane (PU), particularly preferably PVB.

The thickness of each thermoplastic layer is preferably from 0.2 mm to 2 mm, particularly preferably from 0.3 mm to 1 mm, in particular from 0.3 mm to 0.5 mm, for example, 0.38 mm.

The outer pane and the inner pane are preferably made of glass, particularly preferably of soda lime glass, as is customary for windowpanes. The panes can, however, also be made of other types of glass, for example, quartz glass, borosilicate glass, or aluminosilicate glass, or of rigid clear plastics, for example, polycarbonate or polymethylmethacrylate. The panes can be clear, or also tinted or colored, as long as the windshield has adequate light transmittance in the central field of vision, preferably at least 70% in the primary through-vision zone A per ECE-R43.

The outer pane, the inner pane, and/or the intermediate layer can have other suitable coatings, known per se, for example, antireflection coatings, non-stick coatings, anti-scratch coatings, photocatalytic coatings, or solar protection coatings or low-E coatings.

The thickness of the outer pane and the inner pane can vary widely and thus be adapted to the requirements in the individual case. The outer pane and the inner pane preferably have thicknesses of 0.5 mm to 5 mm, particularly preferably of 1 mm to 3 mm.

A major advantage of the invention consists in that a conventional, mechanically hinged sun visor mounted on the vehicle roof can be dispensed with. Consequently, the invention also includes a vehicle, preferably a motor vehicle, in particular a passenger car, that does not have such a conventional sun visor.

The invention also includes a method for producing a windshield according to the invention, wherein at least
a) an outer pane, a first thermoplastic layer, a functional element with electrically controllable optical properties, a second thermoplastic layer, and an inner pane are arranged one atop another in this order, wherein the functional element is arranged in a region above a central field of vision and wherein the first thermoplastic layer and/or the second thermoplastic layer has a tinted or colored region, which is arranged between the functional element and the outer pane or the inner pane,
b) the outer pane and the inner pane are bonded by lamination, wherein an intermediate layer with an incorporated functional element is formed from the first thermoplastic layer and the second thermoplastic layer.

The electrical contacting of the flat electrodes of the functional element is preferably done before the lamination of the windshield.

Any prints present, for example, opaque masking prints or printed busbars for the electrical contacting of the functional element are preferably applied by screen printing.

Lamination is preferably done under the action of heat, vacuum, and/or pressure. It is also possible to use lamination methods known per se, for example, autoclave methods, vacuum bag methods, vacuum ring methods, calender methods, vacuum laminators, or combinations thereof.

The invention also includes the use of a tinted or colored region of a thermoplastic layer for the bonding of a functional element with electrically controllable optical properties to an outer pane or an inner pane of a windshield, wherein an electrically controllable sun visor is realized by means of the tinted or colored region of the thermoplastic layer and the functional element.

BRIEF DESCRIPTION OF THE DRAWINGS

The invention is explained in detail with reference to drawings and exemplary embodiments. The drawings are a schematic representation and are not to scale. The drawings in no way restrict the invention. They depict.

DETAILED DESCRIPTION

Figure 1:
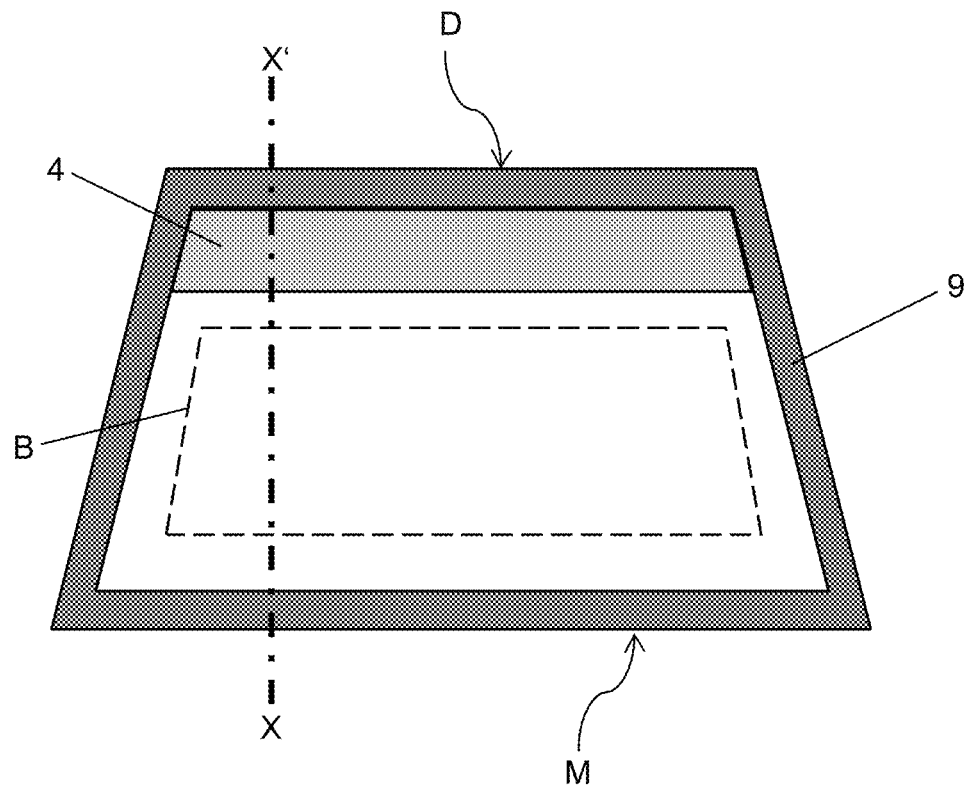
FIG. 1 a plan view of a first embodiment of the windshield according to the invention, FIG. 2 a cross-section through the windshield of FIG. 1, FIG. 3 an enlarged representation of the region Z of FIG. 2, FIG. 4 a cross-section through another embodiment of the windshield according to the invention, FIG. 5 a plan view of another embodiment of the windshield according to the invention, FIG. 6 an exemplary embodiment of the method according to the invention using a flowchart.
Figure 2:
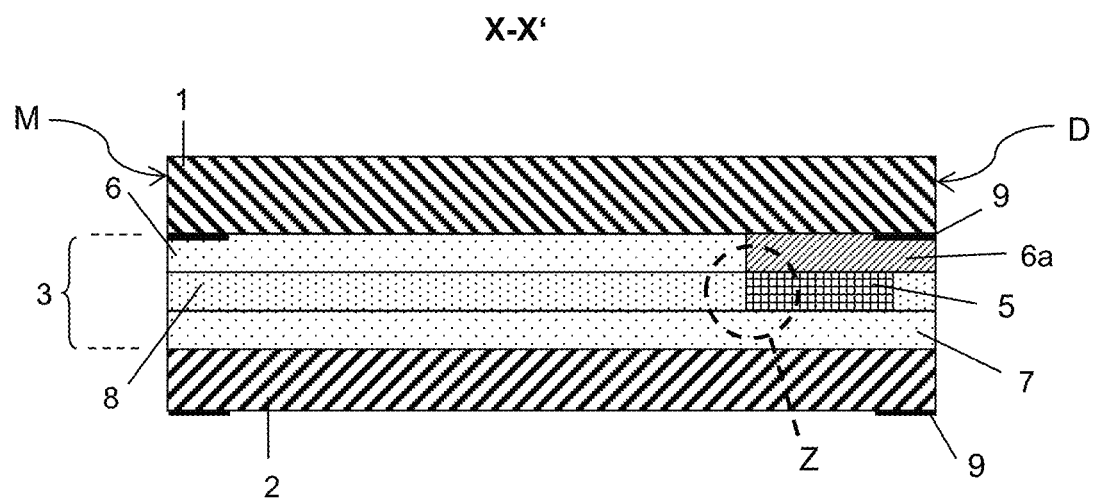
Figure 3:
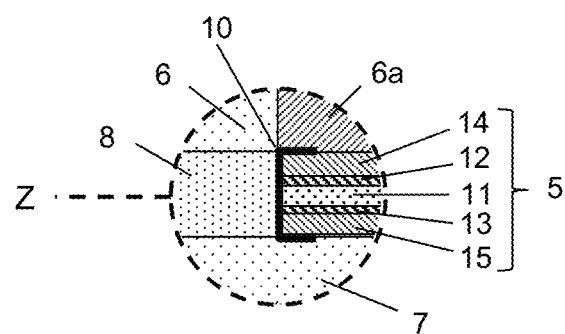

FIG. 1, FIG. 2, and FIG. 3 depict in each case a detail of a windshield according to the invention. The windshield comprises an outer pane 1 and an inner pane 2, which are bonded to one another via an intermediate layer 3. The outer pane 1 has a thickness of 2.1 mm and is made of a green-colored soda lime glass. The inner pane 2 has a thickness of 1.6 mm and is made of a clear soda lime glass.

The windshield has an upper edge D facing the roof in the installed position and a lower edge M facing the engine compartment in the installed position.

The windshield is equipped with an electrically controllable sun visor 4 in a region above the central field of vision B (as defined in ECE-R43). The sun visor 4 is formed by a commercially available PDLC multilayer film as functional element 5, which is incorporated into the intermediate layer 3. The height of the sun visor is, for example, 21 cm. The intermediate layer 3 comprises a total of three thermoplastic layers 6, 7, 8, which is in each case implemented by a thermoplastic film with a thickness of 0.38 mm made of PVB. The first thermoplastic layer 6 is bonded to the outer pane 1; the second thermoplastic layer 7, to the inner pane 2. The third thermoplastic layer 8 therebetween has a cutout, into which the PDLC multilayer film cut to size is inserted with a precise fit, in other words, flush on all sides. The third thermoplastic layer thus forms, so to speak, a sort of mat for the functional element 5, which is thus encapsulated all around in a thermoplastic material and is thus protected.

The first thermoplastic layer 6 has a tinted region 6a that is arranged between the functional element 5 and the outer pane 1. The light transmittance of the windshield is thus additionally reduced in the region of the sun visor 4 and the milky appearance of the PDLC functional element 5 is mitigated in the diffusive state. The aesthetics of the windshield thus become significantly more attractive. The first thermoplastic layer 6 has in the region 6a, for example, an average light transmittance of 30%, with which good results are obtained.

The region 6a can be homogeneously tinted. However, it is visually more attractive for the tinting to decrease in the direction of the lower edge of the functional element 5 such that the tinted and the untinted region transition smoothly from one to the other.

In the case depicted, the lower edges of the tinted region 6a and of the PDLC functional element 5 are arranged flush. This is, however, not necessarily the case. It is also possible for the tinted region 6a to protrude beyond the functional element 5 or, conversely, for the functional element 5 to protrude beyond the tinted region 6a. In the latter case, the entire functional element 5 would not be bonded to the outer pane 1 via the tinted region 6a.

The controllable functional element 5 is a multilayer film, consisting of an active layer 11 between two flat electrodes 12, 13 and two carrier films 14, 15. The active layer 11 includes a polymer matrix with liquid crystals dispersed therein, which align themselves as a function of the electrical voltage applied to the flat electrodes, by which means the optical properties can be controlled. The carrier films 14, 15 are made of PET and have a thickness of, for example, 0.125 mm. The carrier films 14, 15 are provided with a coating of ITO facing the active layer 11 and having a thickness of approx. 100 nm, which form the electrodes 12, 13. The electrodes 12, 13 can be connected to the vehicle's electrical system via busbars (not shown) (implemented, for example, by a silver-containing screen print) and connection cables (not shown).

The windshield has, as is customary, a surrounding peripheral masking print 9, which is implemented by an opaque enamel on the interior-side surfaces (facing the interior of the vehicle in the installed position) of the outer pane 1 and of the inner pane 2. The distance of the functional element 5 from the upper edge D and from the side edges of the windshield is less than the width of the masking print 9 such that the side edges of the functional element 5—with the exception of the side edge pointing toward the central field of vision B—are obscured by the masking print 9. The electrical connections (not shown) are also reasonably installed in the region of the masking print 9 and thus hidden.

The side edges of the functional element 5 are provided peripherally with an edge seal 10, which is implemented by a transparent acrylic adhesive tape. Diffusion into or out of the active layer 11 is thus prevented. Since the edge seal 10 is transparent, the lower side edge, which is not obscured by the masking print 9, is also not disturbingly conspicuous. The edge seal 10 runs peripherally around the side edges of the multilayer film and extends, starting from the side edges, a few millimeters over the surfaces of the carrier films 14, 15 facing away from the active layer 11. The edge seal 10 prevents, in particular, the diffusion of plasticizers and other adhesive components of the thermoplastic layer 8 into the active layer 11, by which means the aging of the functional element 5 is reduced.

A so-called "high flow PVB", which has stronger flow behavior compared to standard PVB films, can preferably be used for the thermoplastic layers 6, 7, 8. Thus, the layers flow more strongly around the functional element 5, by which means a homogeneous visual impression is created and the transition from the functional element 5 to the layer 8 is less conspicuous. The "high flow PVB" can be used for all or even for only one or a plurality of the thermoplastic layers 6, 7, 8 having direct contact with the functional element 5.

Figure 4:
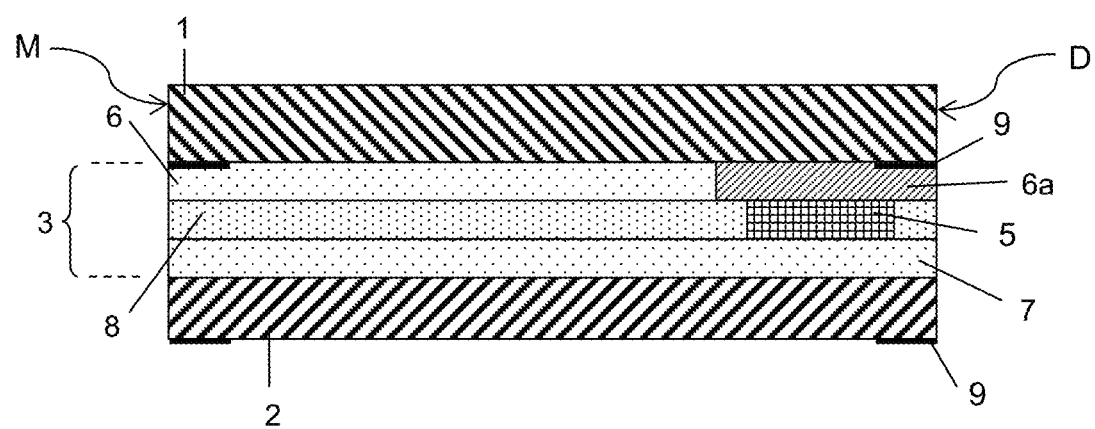

FIG. 4 depicts a cross-section through another embodiment of the windshield according to the invention. The tinted region 6a of the first thermoplastic layer 6 protrudes beyond the lower edge of the functional element 5. The protruding portion of the tinted region 6a can have a transmittance progression such that the tinting phases out, so to speak, toward the central field of vision.

Figure 5:
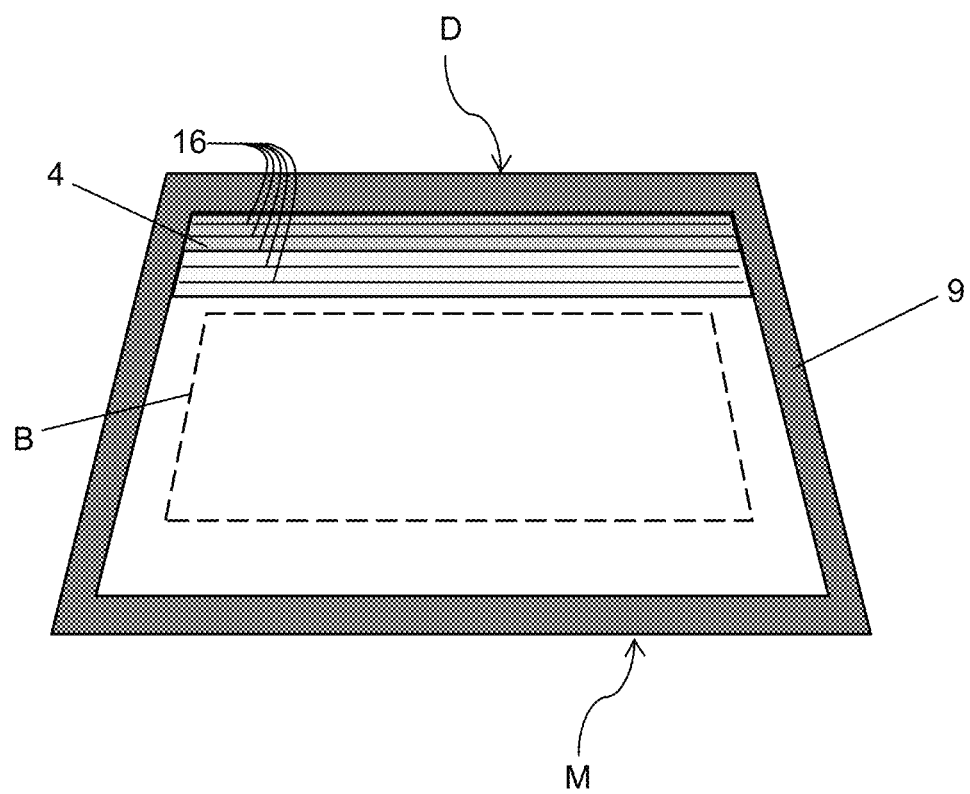

FIG. 5 depicts a plan view of another embodiment of the design of the windshield according to the invention. The windshield and the controllable sun visor 4 correspond substantially to the embodiment of FIG. 1. The PDLC functional element 5 is, however, divided by horizontal isolating lines 16 into six strip-like segments. The isolating lines 16 have, for example, a width of 40 μm to 50 μm and mutual spacing of 3.5 cm. They were introduced into the prefabricated multilayer film using a laser. The isolating lines 16 separate, in particular, the electrodes 12, 13 into strips isolated from one another, each of which has a separate electrical connection. Thus, the segments are switchable independently of one another. The thinner the isolating lines 16, the more inconspicuous they are. Yet thinner isolating lines 16 can be realized using etching methods.

The segmentation enables adjusting the height of the darkened sun visor 4. Thus, the driver can darkened the entire sun visor 4 or only a part thereof depending on the position of the sun. The figure indicates that the upper half of the sun visor 4 is darkened and the lower half is transparent.

In a particularly convenient embodiment, the segmented sun visor 4 is controlled by a capacitive switching area arranged in the region of the sun visor 4, wherein the driver specifies the degree of darkening by means of the location at which he touches the pane. Alternatively, the sun visor 4 can also be controlled by contact-free methods, for example, by recognizing gestures, or as a function of the state of the pupil or eyelid detected by a camera and suitable evaluation electronics.

Figure 6:
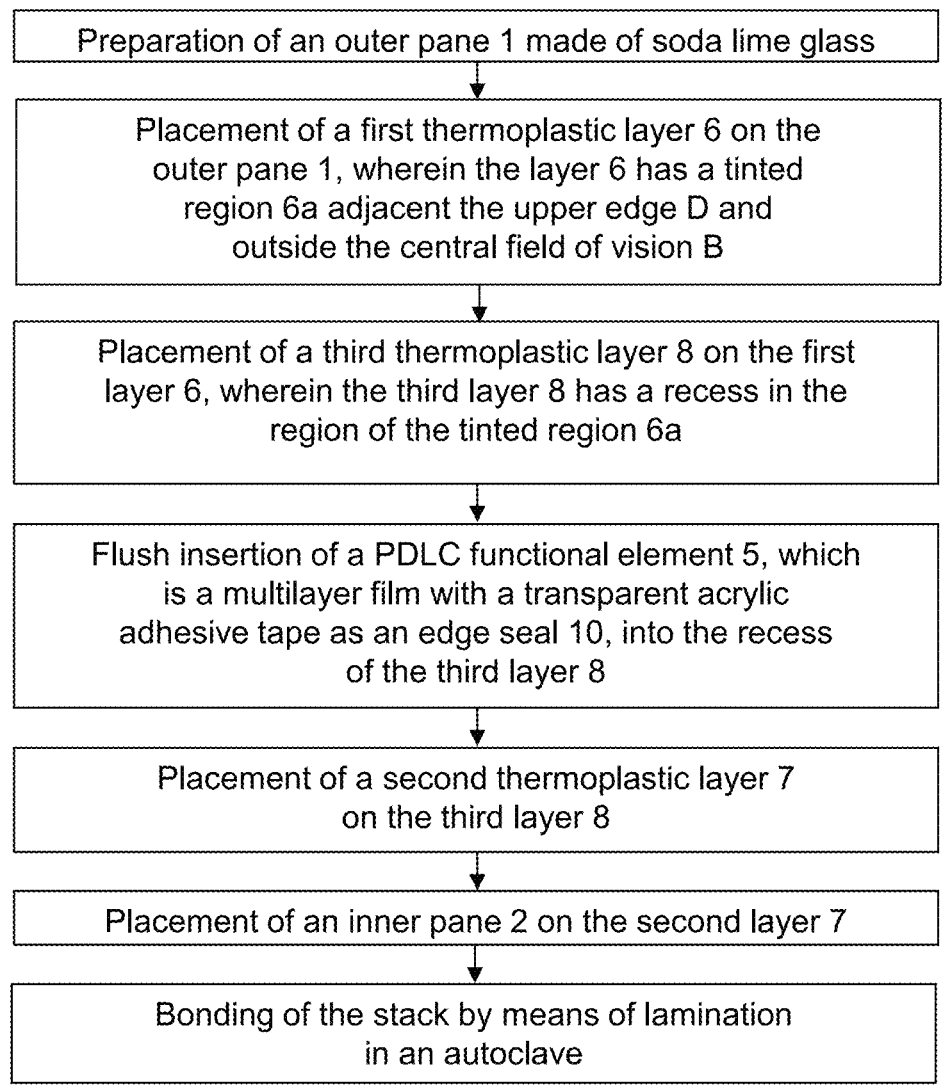

FIG. 6 depicts an exemplary embodiment of the production method according to the invention using a flowchart.

LIST OF REFERENCE CHARACTERS (1) outer pane
(2) inner pane
(3) intermediate layer
(4) electrically controllable sun visor
(5) functional element with electrically controllable optical properties
(6) first thermoplastic layer
(6a) tinted region of the first thermoplastic layer
(7) second thermoplastic layer
(8) third thermoplastic layer
(9) masking print
(10) edge seal
(11) active layer of the functional element 5
(12) flat electrode of the functional element 5
(13) flat electrode of the functional element 5
(14) carrier film
(15) carrier film
(16) isolating lines
B central field of vision of the windshield
D upper edge of the windshield, roof edge
M lower edge of the windshield, engine edge
X-X' section line
Z enlarged region

The invention claimed is:

1. A Windshield with an electrically controllable sun visor, the windshield comprising:
an outer pane;
an intermediate layer; and
an inner pane bonded to the outer pane via the intermediate layer,
wherein above a central field of vision, a functional element with electrically controllable optical properties is incorporated into the intermediate layer,
wherein the functional element is connected to the outer pane via a region of a first thermoplastic layer, and is connected to the inner pane via a region of a second thermoplastic layer, and
wherein at least one of the region of the first thermoplastic layer and the region of the second thermoplastic layer is a tinted or colored region, and
wherein the functional element is divided by isolating lines into segments that can be electrically actuated separately.

2. The windshield according to claim 1, wherein the intermediate layer is transparent in the central field of vision.

3. The windshield according to claim 1, wherein the functional element is a polymer dispersed liquid crystal.

4. The windshield according to claim 1, wherein the tinted or colored region has a transmittance in the visible spectral range of 10% to 50%.

5. The windshield according to claim 1, wherein the tinted or colored region has a transmittance in the visible spectral range of 20% to 40%.

6. The windshield according to claim 1, wherein the functional element comprises an edge seal that is formed by a transparent colorless adhesive and a transparent colorless adhesive tape.

7. The windshield according to claim 1, wherein the functional element is peripherally surrounded by a third thermoplastic layer.

8. The windshield according to claim 7, wherein the lower edge of the functional element is arranged flush with the third thermoplastic layer.

9. The windshield according to claim 1, wherein the upper edge and the side edges of the functional element are obscured in through-vision by an opaque masking print.

10. The windshield according to claim 1, wherein the first thermoplastic layer and the second thermoplastic layer comprise at least one of: polyvinyl butyral (PVB), ethylene vinyl acetate (EVA), and/or polyurethane (PU).

11. The windshield according to claim 1, wherein the first thermoplastic layer and the second thermoplastic layer comprise polyvinyl butyral (PVB).

12. The windshield according to one of claim 1, wherein the tinted or colored region protrudes beyond the lower edge of the functional element.

13. A Vehicle having a windshield, comprising:
a windshield including
an outer pane;
an intermediate layer; and
an inner pane bonded to the outer pane via the intermediate layer,
wherein above a central field of vision, a functional element with electrically controllable optical properties is incorporated into the intermediate layer,
wherein the functional element is connected to the outer pane via a region of a first thermoplastic layer, and is connected to the inner pane via a region of a second thermoplastic layer, and
wherein at least one of the region of the first thermoplastic layer and the region of the second thermoplastic layer is a tinted or colored region and
wherein the vehicle is devoid of a roof-mounted mechanically hinged sun visor, and
wherein the functional element is divided by isolating lines into segments that can be electrically actuated separately.

14. A method for producing a windshield with an electrically controllable sun visor,
the method comprising:
arranging in order, one atop another,
an outer pane,
a first thermoplastic layer,
a functional element with electrically controllable optical properties,
a second thermoplastic layer, and
an inner pane,
wherein the functional element is arranged in a region above a central field of vision, and
wherein the functional element is divided by isolating lines into segments that can be electrically actuated separately and
wherein the first thermoplastic layer and the second thermoplastic layer has a tinted or colored region that is arranged between the functional element and the outer pane and the inner pane, and
bonding the outer pane and the inner pane by lamination, thereby forming, from the first thermoplastic layer and the second thermoplastic layer, an intermediate layer with an incorporated functional element.

15. The method according to claim 14, wherein the functional element is in the form of a multilayer film and is cut to size using a laser.

* * * * *